Figure 1:
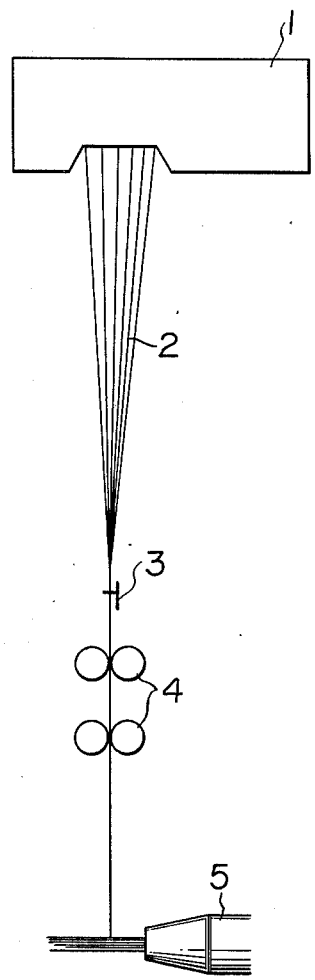
Figure 1:
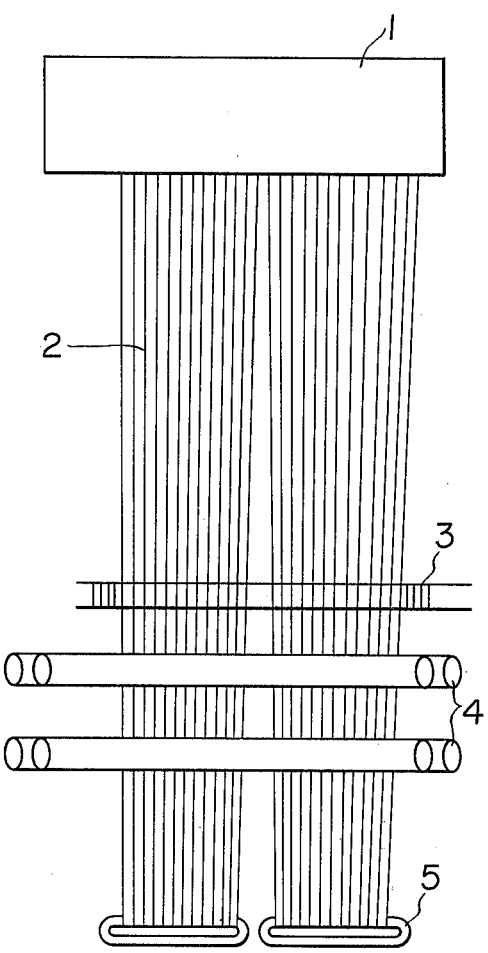

United States Patent [19]

Kawai

[11] 4,038,089

[45] July 26, 1977

[54] PROCESS FOR PRODUCING VITREOUS FIBERS CONTAINING CEMENT AS MAJOR CONSTITUENT

[75] Inventor: Kyosuke Kawai, Fujisawa, Japan

[73] Assignee: Japan Inorganic Material Co., Ltd., Japan

[21] Appl. No.: 640,777

[22] Filed: Dec. 15, 1975

Related U.S. Application Data

[63] Continuation of Ser. No. 384,409, Aug. 1, 1973, abandoned.

[30] Foreign Application Priority Data

June 19, 1973 Japan .................................. 48-68987

[51] Int. Cl.² .......................... C03C 13/00; C03C 3/04
[52] U.S. Cl. ........................................ 106/50; 106/52; 106/73.4; 106/73.5

[58] Field of Search ................. 106/50, 52, 73.3, 73.4, 106/73.5

[56] References Cited

U.S. PATENT DOCUMENTS

| | | | |
|---|---|---|---|
| 2,155,107 | 4/1939 | Tyler | 106/50 |
| 2,557,834 | 6/1951 | McMullen | 106/50 |
| 2,970,924 | 2/1961 | Fox et al. | 106/50 |

Primary Examiner—Winston A. Douglas
Assistant Examiner—John F. Niebling
Attorney, Agent, or Firm—Toren, McGeady and Stanger

[57] ABSTRACT

Process for producing vitreous fibers containing cement as major constituent, comprising making fibers from a molten mixture of powders containing cement as a major constituent and silica sand.

3 Claims, 2 Drawing Figures (B) (A)

PROCESS FOR PRODUCING VITREOUS FIBERS CONTAINING CEMENT AS MAJOR CONSTITUENT

This is a continuation of application Ser. No. 384,409, filed Aug. 1, 1973 now abandoned.

As generally recognized, cement is an abbreviated designation for portland cement, which includes white cement. Approximately 140 years have passed since the discovery of portland cement. Most commonly, portland cement is produced from fine powders of lime stone and clay which in the form of a thick slurry with water are ignited with the flame of gas, oil or powdered coal in a long rotary kiln. The temperature at the hotter end of the kiln is about 1500° C, where alluminosilicates are sintered into small balls called clinkers. The clinkers are crushed into fine powder in a ball mill, to obtain cement.

Generally speaking, commercially available cement all over the world maintaining a certain limited composition when kept in the dry condition, as fine powders and is cheap and readily available everywhere in the world. Therefore, is would be generally profitable if cement could be used as an ingredient of vitreous fibers.

In ordinary cement, gypsum is added in the last stage of production, which, however, is a useless component for vitreous fibers. Therefore, cement not containing gypsum or having an $SO_3$ content are best to be prepared and used. This would be possible merely by negotiating with cement makers. Since there exists a remarkable difference between the components of cement and glass, it is difficult to prepare fibers by simply heating cement, especially to 1100° to 1500° C at which temperatures ordinary glass fibers are prepared.

The present inventors have found heat for preparing vitreous fibers, another ingredient having the same particle size as the cement should be added to the cement and the mixture be heated, melted and processed into fibers, and that the ingredient to be added should be easy to melt with little evolution of a gas.

The present invention will be described referring to the attached drawings.

Figure 2:
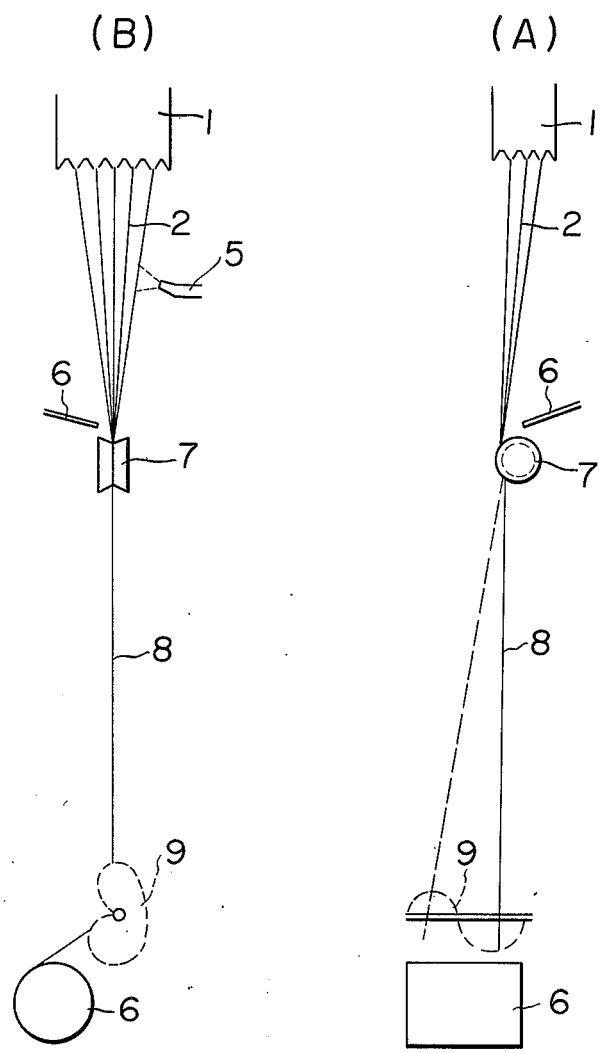

FIGS. 1 and 2 illustrate apparatuses for producing short and long fibers, respectively, which were employed in realizing the present invention.

The chemical composition (in weight percentages) of ordinary portland cement is as follows: Silicon 20–32%; Alumina 1–5%; Ferric oxide 1–6%; Calcium oxide 60–72%.

It can be seen from the above composition that silica is the ingredient most lacking for preparing vitreous fibers. Therefore, the composition of cement could be made closer to that of glass by supplying silica.

The present inventors have succeeded in preparing fibers from a melt of a mixture prepared by adding to cement, those materials which contained a large amount of silica or a high silica content, such as, "shirasu" ($SiO_2$ 65–73%, $Al_2O_3$ 12–16%, $Fe_2O_3$ 1–3%, CaO 2–4%, $K_2O$ 2–4%, $Na_2O$ 3–4% by weight) and zirconflour ($SiO_2$ 32.60%, $ZrO_2$ 66.90%, $TiO_2$ 0.12%, $Al_2O_3$ 0.43%, $Fe_2O_3$ 0.04%, MgO 0.03% $P_2O_3$ 0.007% by wight).

The powdery mixture shown above could be prepared into long or short fibers as desired when spun into ordinary vitreous fibers as illustrated in FIGS. 1 and 2. Owing to the fact that no bubbles are formed, heat is transmitted uniformly and, as a result, relatively long and uniform fibers can be prepared.

FIG. 1: Apparatus for Producing Short Fibers

In FIG. 1 which shows the typical apparatus for producing short fibers, A is a front view and B is a side view. Raw material powder is introduced into the melting furnace 1 where the temperature is first raised to assure complete melting. When the melting is completed, the melt flows out from a nozzle forming single fibers 2, which are supported with a comb 3 so that none of the fibers cross each other. Further the fibers are processed into a certain thickness with rubber roller 4 placed beneath. Then the fibers become shorter by being blown with a burner 5.

In this case, the maximum temperature is 1500° C. Powders that require a temperature higher than 1500° C for melting, such as, for example, powders of iron, cannot be formed into single fibers because of the solidification point being too close to the melting point. For the safety of the furnace, the apparatus for preparing both short and long fibers is operated at a temperature not higher than 1500° C, and usually in the range between 1200° to 1300° C.

FIG. 2: Apparatus for Producing Long Fibers

FIG. 2 is a typical apparatus for producing long fibers. A is a front view and B a side view. Raw material powder is introduced into the melting furnace 1 where the temperature is first raised to assure complete melting of the contents. At the completion of the melting, the melt flows out from a nozzle forming single fibers 2 Several single fibers, to which a bundling agent is applied from a bundling agent supplier 6, are bundled with bundling roller 7 into strands 8. The strands are wound at a high speed on the winding drum 10 while traverse is given with a tranverse guide 9.

Similarily as the apparatus for producing short fibers, the maximum temperature of the furnace is 1500° C.

The present invention will be clear from the following examples.

EXAMPLE 1

1. Cement

Commercially available portland cement containing $SO_3$ was used.

2. Silica Sand

Readily melted and powdery silica sand which has been converted into tridymite or christobalite is desirable, for example, such as, silica sand from Yuo Island, white clay from Beppu, Japan and commercial silica powder having the chemical composition shown in the following table. Fine powder which passed a 65-mesh sieve was used.

|  | $SiO_2$ | $Al_2O_3$ | $Fe_2O_3$ | $TiO_2$ | CaO | MgO | $K_2O$ | $Na_2O$ |
|---|---|---|---|---|---|---|---|---|
| Silica sand from Yuo Island | 97.50 | 0.88 | 0.014 | 0.29 | 0.02 | 0.10 | 0.04 | 0.18 |
| White clay from Beppu | 95.25 | 1.36 | 0.12 | 1.11 | 0.16 | 0.08 | 0.02 | 0.14 |
| Commercial |

-continued

|  | $SiO_2$ | $Al_2O_3$ | $Fe_2O_3$ | $TiO_2$ | CaO | MgO | $K_2O$ | $Na_2O$ |
|---|---|---|---|---|---|---|---|---|
| silica powder | 98.62 | 0.51 | 0.044 | 0.02 | 0.07 | 0.05 | 0.06 | 0.03 |

3. Process

The above mixed powders, thoroughly mixed in a ball mill, were introduced into a furnace for producing long fibers, heated at first at a temperature at 1450° C to assure complete melting. The melt flowed out from a nozzle of 4mm in diameter. The spun fibers were wound on a drum while being maintained at an appropriate temperature.

When a composition other than those used in this example was used, spinning was impossible at a temperature below 1500° C. For example, when the ratio in percentage by weight of the portland cement to the silica powder selected from the group consisting of white clay from Beppu, silica sand from Yuo Island and commercial silica powder was greater than 8/2, the spinning temperature inevitably exceeded 1500° C.

4. Qualities of the vitreous fibers obtained are shown in Table 1.

Table 1

| Material Admixture | | Composition | | | | | | |
|---|---|---|---|---|---|---|---|---|
| | | $SiO_2$ | $Al_2O_3$ | $Fe_2O_3$ | $TiO_2$ | CaO | MgO | $K_2O$ |
| Portland cement / Silica sand from Yuo Island | = a5/5 | 59.55 | 3.04 | 1.607 | 0.145 | 32.61 | 0.9 | 0.02 |
| " | =6/4 | 51.96 | 3.472 | 1.926 | 0.116 | 39.13 | 1.06 | 0.016 |
| " | =7/3 | 44.37 | 3.904 | 2.244 | 0.087 | 45.646 | 1.22 | 0.012 |
| " | =8/2 | 36.87 | 4.336 | 2.563 | 0.058 | 52.164 | 1.38 | 0.008 |
| Portland cement / White clay from Beppu | = 5/5 | 58.43 | 3.28 | 1.66 | 0.555 | 32.68 | 0.89 | 0.01 |
| " | =6/4 | 51.06 | 3.66 | 1.968 | 0.444 | 39.18 | 1.05 | 0.008 |
| Portland cement / Commercial silica powder | = 5/5 | 60.11 | 2.86 | 1.622 | 0.01 | 32.64k | 0.835 | 0.03 |
| " | =6/4 | 52.41 | 3.32 | 1.938 | 0.008 | 39.128 | 1.04 | 0.024 |
| " | =7/3 | 44.71 | 3.19 | 2.253 | 0.006 | 45.661 | 1.21 | 0.018 |
| " | =8/2 | 37.00 | 4.26 | 2.569 | 0.004 | 52.174 | 1.37 | 0.012 |

| $Na_2O$ | $SO_3$ | Spinning temperature(° C) | Diameter of fiber $\mu$ | Tensile strength (kg/mm$^2$) | Elongation (%) |
|---|---|---|---|---|---|
| 0.09 | 0.75 | 1390 – 1440 | 18.025 | 68.369 | 2.00 |
| 0.072 | 0.90 | 1410 – 1440 | 23.908 | 52.278 | 2.275 |
| 0.054 | 1.05 | 1410 – 1440 | 23.424 | 59.682 | 1.325 |
| 0.036 | 1.20 | 1440 – 1490 | 20.132 | 72.400 | 2.225 |
| 0.07 | 0.75 | 1390 – 1440 | 33.533 | 60.283 | 2.920 |
| 0.056 | 0.90 | 1390 –1440 | 29.683 | 45.460 | 2.750 |
| 0.015 | 0.75 | 1440 | 23.518 | 43.549 | 2.500 |
| 0.012 | 0.90 | 1420 – 1480 | 30.310 | 56.170 | 2.775 |
| 0.009 | 1.05 | 1380 – 1460 | 19.445 | 63.956 | 1.650 |
| 0.006 | 1.20 | 1440 – 1450 | 19.002 | 52.728 | 1.900 |

EXAMPLE 2

1. Cement

The same material as in Example 1 was used.

2. Powders

"Shirasu" occurs everywhere in Kagoshima Prefecture, Japan but there has been known no particularly profitable use for it. This example, which shows the useful application of "shirasu," illustrates the value of this invention.

Data concerning the samples of "shirasu" and the chemical composition thereof are shown in Table 2. This example was carried out using the "shirasu" sample indicated as No. 10, from which iron as removed with a magnet.

Table 2

| Place of occurrence | Aira caldera | | | | | |
|---|---|---|---|---|---|---|
| Chemical analysis No. | 1 | 2 | 3 | 4 | 5 | 6 |
| | Kagoshima | " | " | " | Koriyama | " |
| Sample No. | No. 1 | No. 2 | No. 4 | No. 8 | No. 6 | No. 7 |
| Designation | Aira shirasu | " | " | Aira secondary (sedimentary shirasu) | Aira shirasu Nakagawa Koriyama-cho, Hioki-gun | " |
| Sampling place | Kagoshima city | " | " | " | " | " |
| Analyzed by | Hiroko Ebihara | " | " | " | " | " |
| Sampled by | Sadatoshi Tsuyuki | " | " | " | " | " |
| $SiO_2$ | 68.60 | 71.02 | 71.06 | 71.40 | 70.40 | 71.22 |
| $TiO_2$ | 0.29 | 0.20 | 0.26 | 0.25 | 0.29 | 0.25 |
| $Al_2O_3$ | 15.08 | 14.67 | 13.62 | 13.65 | 13.96 | 13.51 |
| $Fe_2O_3$ | 0.98 | 1.19 | 0.52 | 0.76 | 0.86 | 0.89 |

Table 2-continued

| | | | | | | |
|---|---|---|---|---|---|---|
| FeO | 1.80 | 1.56 | 1.71 | 1.55 | 1.67 | 1.57 |
| MnO | 0.07 | 0.07 | 0.05 | 0.04 | 0.05 | 0.05 |
| MgO | 0.61 | 0.60 | 0.61 | 0.48 | 0.64 | 0.54 |
| CaO | 2.66 | 2.71 | 2.17 | 1.88 | 2.06 | 2.19 |
| $Na_2O$ | 3.44 | 3.20 | 3.30 | 3.36 | 3.06 | 3.50 |
| $K_2O$ | 2.28 | 2.28 | 2.70 | 2.70 | 2.70 | 2.82 |
| $H_2O+$ | 3.04 | 2.42 | 3.12 | 3.40 | 3.14 | 2.84 |
| $H_2O-$ | 0.50 | 0.44 | 0.48 | 0.62 | 0.52 | 0.36 |
| $P_2O_5$ | 0.08 | 0.10 | 0.10 | 0.05 | 0.09 | 0.09 |
| Total | 99.43 | 100.46 | 99.70 | 100.14 | 99.44 | 99.83 |

Aira caldera

| | 7 | 8 | 9 | 10 |
|---|---|---|---|---|
| | 661229A | 64101105 | 64121301 | 64121302 |
| | Aira Shirasu | " | " | " |
| | Nakano Kajiki-cho Aira-gun | Izumi city | Sanmonji Osaki-cho Soo-gun | Shibushi-cho Soo-gun |
| | Hiroko Ebihara Masanori Kojima | " Noboru Oba | Ebihara Oba | " |
| $SiO_2$ | 68.48 | 71.86 | 71.70 | 70.82 |
| $TiO_2$ | 0.26 | 0.20 | 0.20 | 0.24 |
| $Al_2O_3$ | 14.74 | 13.35 | 13.59 | 14.02 |
| $Fe_2O_3$ | 1.23 | 0.93 | 0.75 | 0.95 |
| FeO | 1.59 | 1.38 | 1.47 | 1.40 |
| MnO | 0.37 | 0.05 | 0.05 | 0.07 |
| MgO | 0.47 | 0.52 | 0.62 | 0.52 |
| CaO | 2.64 | 1.92 | 2.07 | 1.90 |
| $Na_2O$ | 2.90 | 3.30 | 3.52 | 3.30 |
| $K_2O$ | 2.10 | 2.70 | 2.90 | 2.90 |
| $H_2O+$ | 4.54 | 3.42 | 3.08 | 3.60 |
| $H_2O-$ | 1.14 | 0.44 | 0.48 | 0.96 |
| $P_2O_5$ | 0.07 | 0.07 | 0.06 | 0.03 |
| Total | 100.53 | 100.34 | 100.49 | 100.77 |

Aira caldera

| | 11 | 12 | 13 | 14 |
|---|---|---|---|---|
| | 65100101 | 65100102 | 65111505 | " |
| | Aira shirasu | " | " | Eguchiura Higashi Ichiki-cho Hioki-gun |
| | Makurazaki city, | " | Sakanoue Taniyama city | |
| | Ebihara Saburo Fujimiya | " " | " Oba | Rokumi Miyaji Rokumi Miyaji |
| $SiO_2$ | 72.54 | 71.46 | 71.72 | 68.07 |
| $TiO_2$ | 0.28 | 0.23 | 0.21 | 0.36 |
| $Al_2O_3$ | 13.56 | 14.15 | 14.14 | 16.13 |
| $Fe_2O_3$ | 0.52 | 0.54 | 0.64 | 1.09 |
| FeO | 1.51 | 1.68 | 1.51 | 1.41 |
| MnO | 0.08 | 0.08 | 0.05 | 0.04 |
| MgO | 0.48 | 0.44 | 0.48 | 0.97 |
| CaO | 1.96 | 1.99 | 2.13 | 2.90 |
| $Na_2O$ | 3.30 | 3.72 | 3.20 | 3.21 |
| $K_2O$ | 2.54 | 2.28 | 2.48 | 2.98 |
| $H_2O+$ | 2.60 | 2.96 | 2.92 | 2.83 |
| $H_2O-$ | 0.36 | 0.38 | 0.50 | 0.68 |
| $P_2O_5$ | 0.02 | 0.01 | 0.04 | 0.14 |
| Total | 99.75 | 99.92 | 100.02 | 100.81 |

| Ikeda caldera | Ata caldera | Ata caldera |
|---|---|---|
| 15 | 16 | 17 |
| 64102301 | 66122505 | 66122502 |
| Ikeda shirasu | White-colored matter at lower part of Ata shirasu | Brown-colored matter at upper part of Ata shirasu |
| Ikezaki Ikeda-ko Ebihara Oba | Onejime-cho Kimotsuki-gun Noboru Oba Oba & Tsuyuki | Onejime-cho Kimotsuki-gun Noboru Oba Oba & Tsuyuki |
| 69.76 | 64.67 | 66.06 |
| 0.43 | 0.62 | 0.66 |
| 13.82 | 15.44 | 15.43 |
| 1.57 | 4.72 | 2.82 |
| 1.71 | 1.82 | 1.47 |
| 0.02 | 0.10 | 0.10 |
| 0.99 | 0.98 | 0.87 |
| 0.69 | 3.47 | 3.55 |
| 3.72 | 3.47 | 3.20 |
| 2.48 | 1.58 | 1.80 |
| 2.30 | 3.11 | 3.00 |
| 0.44 | 0.53 | 0.46 |
| 0.09 | 0.13 | 0.16 |

Table 2-continued

| 100.02 | 100.64 | 99.58 |
|--------|--------|-------|

3. Process

The mixed powders above were introduced into a furnace for producing long fibers, which was heated at first at a temperature of 1440° C to assure complete melting. The melt flowed out from a nozzle of 4mm in diameter. The spun fibers were wound on a drum while being maintained at an appropriate temperature. It was comfirmed that spinning was impossible at a temperature below 1500° C when a composition other than those in this example was used.

The spinning temperature became higher than 1500° C when the ratio of portland cement to "shirasu" was larger than 55/45 or smaller than 20/90.

4. Qualities of the fibers obtained are shown in Table 3.

4. Qualities of the vitreous fibers obtained are shown in Table 4.

Table 4

| Zircon flower | Diameter of fiber (μ) | Tensile strength (Kg/mm²) | Composition (% by weight) | | | | | | | | |
|---|---|---|---|---|---|---|---|---|---|---|---|
| | | | $SiO_2$ | $Al_2O_3$ | $Fe_2O_3$ | $TiO_2$ | $ZrO_2$ | CaO | MgO | $Na_2O$ | $SO_3$ |
| Cement 50 | 2.5 | 18.43 | 64.06 | 59.15 | 3.01 | 1.53 | 0.14 | 1.00 | 32.13 | 0.92 | 0.10 | 0.74 |
| + | 7.5 | 20.26 | 67.53 | 58.33 | 2.90 | 1.54 | 0.14 | 3.04 | 31.13 | 0.86 | 0.10 | 0.72 |
| Silica | 12.5 | 18.51 | 68.53 | 57.51 | 2.84 | 1.49 | 0.14 | 5.07 | 30.14 | 0.83 | 0.09 | 0.69 |
| sand from | 17.5 | 19.30 | 71.41 | 56.69 | 2.76 | 1.44 | 0.14 | 7.09 | 29.15 | 0.81 | 0.09 | 0.67 |
| Yuo Island 50 | 25.0 | 18.09 | 64.46 | 55.44 | 2.64 | 1.37 | 0.14 | 10.14 | 27.65 | 0.77 | 0.08 | 0.64 |
| Cement 50 | 2.5 | 14.14 | 69.42 | 59.70 | 2.82 | 1.60 | 0.01 | 1.01 | 32.15 | 0.86 | 0.04 | 0.74 |
| + | 7.5 | 14.97 | 70.28 | 58.86 | 2.74 | 1.55 | 0.02 | 2.03 | 31.15 | 0.84 | 0.04 | 0.72 |
| Silica | 12.5 | 16.48 | 75.11 | 58.02 | 2.66 | 1.50 | 0.02 | 5.06 | 30.16 | 0.81 | 0.04 | 0.69 |
| Powder | 17.5 | 15.92 | 82.69 | 57.19 | 2.60 | 1.46 | 0.02 | 7.08 | 29.18 | 0.79 | 0.04 | 0.67 |
| 50 | 25.0 | 17.19 | 68.17 | 55.91 | 2.49 | 1.39 | 0.02 | 10.11 | 29.67 | 0.75 | 0.04 | 0.64 |

Table 3

| Admixing ratio of portland cement to "shirasu" | Load (g) | Tensile strength (kg/mm²) | Elongation (%) | Diameter of fiber (μ) | Composition | | | | | | |
|---|---|---|---|---|---|---|---|---|---|---|---|
| | | | | | $SiO_2$ | $Al_2O_3$ | $Fe_2O_3$ | CaO | MgO | $K_2O$ | $Na_2O$ |
| 55/45 | 17.33 | 40.167 | 1.023 | 15.825 | 42.93 | 9.16 | 2.66 | 37.21 | 0.94 | 1.3 | 1.58 |
| 50/50 | 18.05 | 58.667 | 1.625 | 15.724 | 45.30 | 9.60 | 2.60 | 34.10 | 0.85 | 1.5 | 1.75 |
| 45/55 | 16.96 | 55.526 | 1.598 | 15.904 | 47.67 | 10.04 | 2.54 | 30.99 | 0.77 | 1.6 | 19.3 |
| 40/60 | 15.88 | 52.705 | 1.575 | 16.001 | 50.04 | 10.48 | 2.48 | 27.88 | 0.68 | 1.8 | 2.10 |
| 35/65 | 12.01 | 47.522 | 1.336 | 14.022 | 52.41 | 10.92 | 2.42 | 24.77 | 0.60 | 1.9 | 2.22 |
| 30/70 | 7.94 | 41.866 | 1.075 | 12.588 | 54.78 | 11.36 | 2.36 | 21.66 | 0.51 | 2.1 | 2.45 |
| 20/80 | 8.25 | 40.350 | 1.005 | 12.010 | 57.38 | 12.24 | 2.20 | 18.32 | 0.38 | 2.4 | 2.74 |

EXAMPLE 3

1. Cement

The same material as in Example 1 was used.

2. Powders

A. Separate mixtures of the cement with each of silica sand from Yuo Island and silica powder, that passed through a 65-mesh sieve, in equal amounts were used.

b. To the above mixtures, zircon flour (having a ratio in weight of $SiO_2/ZrO_2$ of 36/44) that passed a 300-mesh sieve was mixed in the amounts of 2.5, 7.5, 12.5, 17.5 and 25.0% and each mixture was tested.

3. Process

The above powders, thoroughly mixed with a ball mill, were introduced into a furnace for producing long fibers, which was heated at first at a temperature of 1490° C to assure complete melting. The melt flowed out from a nozzle. The spun fiber were wound on a drum while the appropriate temperature was being maintained.

EXAMPLE 4

1. Cement

Portland cement containing no $SO_3$ which could be obtained by negotiating with a cement maker was used.

2. Powders

A mixed powder consisting of 20 to 40% of "shirasu" and 20 to 40% of silica sand was used.

3. Process

The above mixture of powders were introduced into a furnace for producing short fibers, which was heated at first to a temperature of 1440° C to assure complete melting. The melt flowed out from a nozzle. While this temperature was being maintained, the fibers formed were blown with a burner to prepare short fibers.

4. Physical properties of the short fibers produced

| Appearance | White bulky |
|---|---|
| Diameter | less than 3μ |
| Length | 5 to 10 mm |
| Ratio of granule content | less than 3% |

The short fibers could be prepared more easily than long fibers.

What is claimed is:

1. A process for producing vitreous fibers containing cement as a major constituent, consisting essentially of mixing the following components in the form of powders:

40 to 50% by weight, Portlant cement; 2.5to 25% by weight, zircon flour; and 40 to 48% by weight, shirasu, having a composition of 65 to 73% $SiO_2$, 12 to 16% $Al_2O_3$, 1 to 3% $Fe_2O_3$, 2 to 4% CaO, 2 to 4% $K_2O$, and 3 to 4% $Na_2O$; melting the mixture and making fibers from the molten mixture.

2. A process for producing vitreous fibers containing cement as a major constituent, consisting essentially of mixing the following components in the form of powders:

40 to 50% by weight, Portland cement; 2.5 to 25% by weight, zircon flour; 18 to 25% by weight, silica sand; and 17 to 25% by weight, shirasu, having a composition of 65 to 73% $SiO_2$, 12 to 16% $Al_2O_3$, 1 to 3% $Fe_2O_3$, 2 to 4% CaO, 2 to 4% $K_2O$, and 3 to 4% $Na_2O$; melting the mixture and making fibers from the molten mixture.

3. A process for producing vitreous fibers containing cement as a major constituent, consisting essentially of mixing the following components in the form of powders:

40 to 50% by weight, Portland cement; 2.5 to 25% by weight, zircon flour; and 35 to 47.5% by weight, silica sand; melting the mixture and making fibers from the molten mixture.

* * * * *